United States Patent [19]

Fukami et al.

[11] Patent Number: 5,191,561
[45] Date of Patent: Mar. 2, 1993

[54] MAGNETOOPTICAL RECORDING MEDIUM INCLUDING FIVE MAGNETIC LAYERS FOR DIRECT OVERRIDING BY LIGHT INTENSITY MODULATION WITHOUT AN EXTERNAL BIAS FIELD

[75] Inventors: Tatsuya Fukami; Kazuhiko Tsutsumi; Takashi Tokunaga; Yoshiyuki Nakaki, all of Hyogo, Japan

[73] Assignee: Mitsubishi Denki Kabushiki Kaisha, Japan

[21] Appl. No.: 757,685

[22] Filed: Sep. 11, 1991

[30] Foreign Application Priority Data

Nov. 26, 1990 [JP] Japan .................................. 2-324271
Nov. 26, 1990 [JP] Japan .................................. 2-324272
Nov. 26, 1990 [JP] Japan .................................. 2-324275
Nov. 26, 1990 [JP] Japan .................................. 2-324276

[51] Int. Cl.$^5$ .................... G11B 13/04; G11B 11/14; G11B 7/24
[52] U.S. Cl. ......................... 369/13; 365/122; 360/59; 360/114; 478/694
[58] Field of Search .......... 369/13, 14; 360/59, 360/114; 365/122, 22, 10, 27; 428/694

[56] References Cited

U.S. PATENT DOCUMENTS

4,878,132 10/1989 Aratani et al. ................... 360/59
4,955,007 9/1990 Aratani et al. ................... 369/13

FOREIGN PATENT DOCUMENTS

0258978 3/1988 European Pat. Off. ............. 369/13
62-241154 10/1987 Japan .................................. 360/114
63-70944 3/1988 Japan .................................. 360/114
1-241051 9/1989 Japan .................................. 369/13

OTHER PUBLICATIONS

Saito et al., "Direct Overwrite by Light Power Modulation on Magneto-Optical Multi-Layered Media", Proc. Int. Symp. on Optical Memory, 1987, Japanese Journal of Applied Physics, vol. 26 (1987), Supplement 26-4, pp. 155-159.

Primary Examiner—Hoa Nguyen
Attorney, Agent, or Firm—Wolf, Greenfield & Sacks

[57] ABSTRACT

This invention relates to a magnetooptical recording medium that is capable of direct overwriting by light intensity modulation without using a separate source for generating an external magnetic field and that has four magnetic layers superposed on a substrate, wherein said magnetic layers has vertical magnetic anisotropy and any two adjacent layers being bound by exchange force. The medium is characterized in that a fifth magnetic layer not bound by exchange force is provided over the fourth magnetic layer or that a layer made of a rare earth element/transition metal alloy in which the magnetization of rare earth elements is dominant is provided between the first and second magnetic layers which are bound together by exchange force.

16 Claims, 14 Drawing Sheets

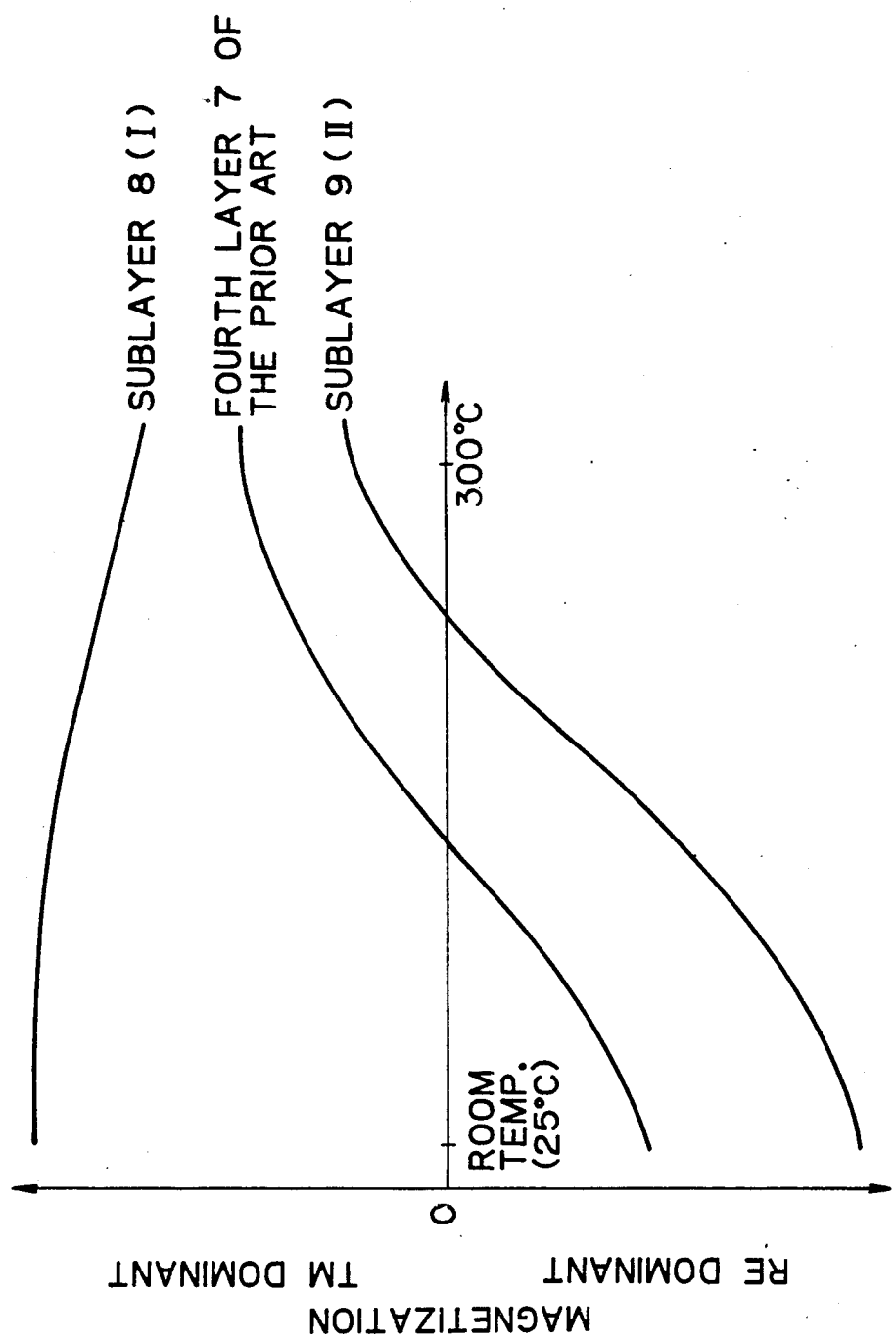

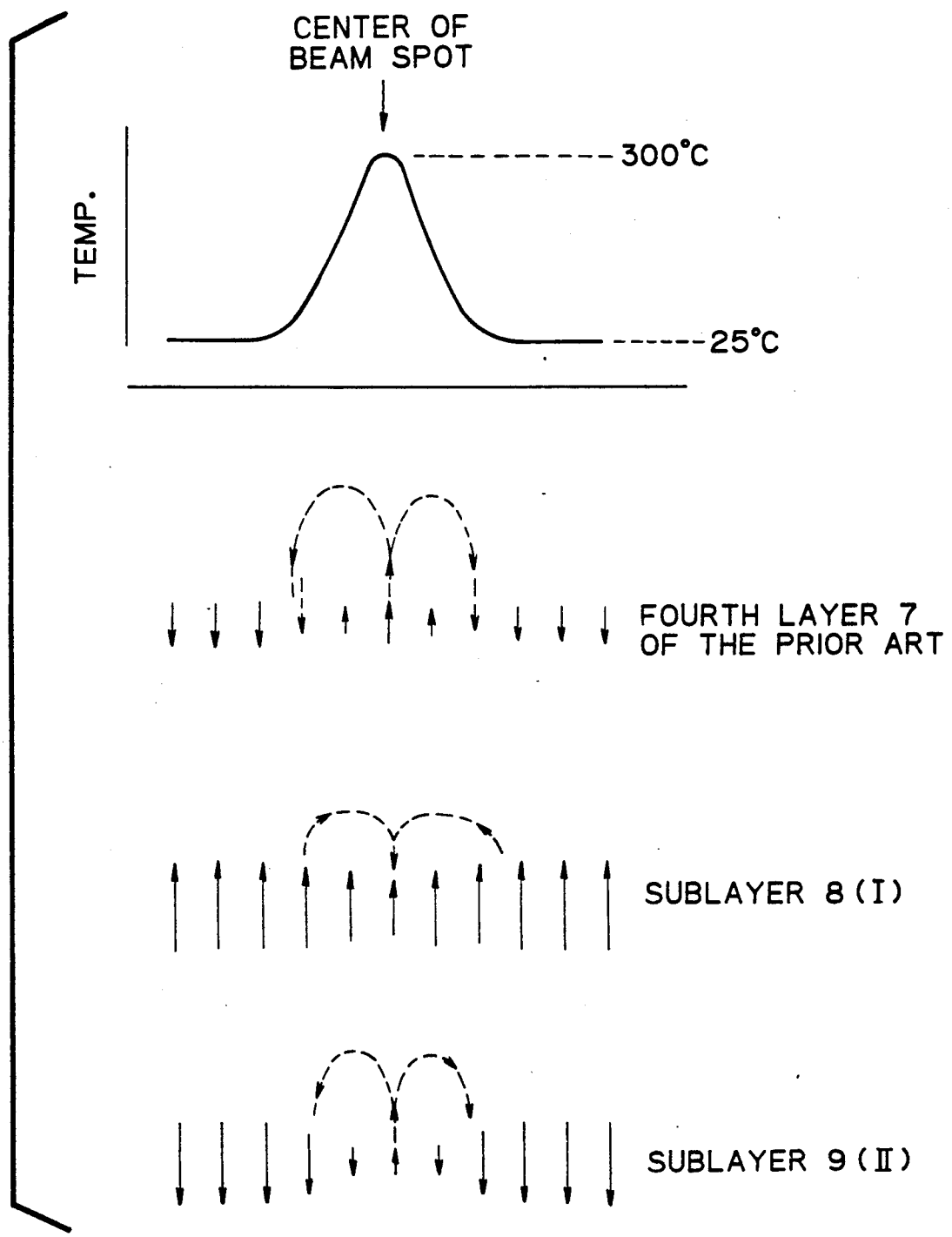

MAGNETOOPTICAL RECORDING MEDIUM INCLUDING FIVE MAGNETIC LAYERS FOR DIRECT OVERRIDING BY LIGHT INTENSITY MODULATION WITHOUT AN EXTERNAL BIAS FIELD

BACKGROUND OF THE INVENTION

This invention relates to a magnetooptical recording medium that is capable of direct overwriting by light intensity modulation without using a separate source for generating an external magnetic field.

A prior art magnetooptical recording medium capable of light-modulated overwriting is described in Journal of Applied Physics, Vol. 67, No. 9, pp. 4415–4416 and its basic structure is shown diagrammatically in FIG. 1 together with the magnetic field generation source and light beam for recording and reproduction purposes; shown by 1 is a light beam that issues from a light source such as a laser and that is focused by a lens; 2 is the source of generating a magnetic field Hb; 3 is a transparent glass or plastic substrate; 4–7 are four magnetic layers that are bound together by exchange force. The first layer 4 stores binary-level information 0 or 1 depending upon whether magnetization is directed upward or downward. In a reproduction mode, a laser beam is applied and the resulting magnetooptical Kerr effect causes the plane of polarization to rotate, whereupon the direction of magnetization is read out as binary-level information. The second to fourth layers 5–7 are necessary for achieving light-modulated overwriting. In particular, the fourth layer 7, after it is formed, is magnetized over the entire surface in a uniform direction, say, upward. Since the fourth layer 7 has an extremely high Curie point and a large coercive force, it will not experience reversal of magnetization in either a recording or reproduction mode and instead it will maintain the upward direction of magnetization almost indefinitely. The specific actions of the second and third layers 5 and 6 will be described later in this specification. The Curie points of the four layers generally have the following relationship (with the Curie point of the i-th layer being denoted by Tci):

$$Tc3 < Tc1 < Tc2 < Tc4.$$

The mechanism of direct overwriting is described below with reference to FIG. 2. FIG. 2A shows diagrammatically how the magnetization of each layer changes in a recording mode, and FIG. 2B is a graph showing the intensity profile of a laser beam during recording and reproduction. As shown in FIG. 2B, the laser beam can take on three intensity levels, $P_R$, $P_L$ and $P_H$ (R, read; L, low; H, high). $P_R$ which represents the intensity level in a reproduction mode is so small that it will not cause any change in the state of magnetization of the medium. On the other hand, $P_L$ and $P_H$ which represent the intensity levels of the laser beam applied in a recording mode are large enough to change the state of magnetization of the medium. These two intensity levels satisfy the relation $P_H > P_L$. When "0" of binary-level information is to be recorded, the laser beam is applied at the intensity level $P_L$ and, if "1" is to be recorded, the laser beam is applied at the intensity $P_H$. When the medium is illuminated with $P_L$, its temperature rises up to $T_L$ and if it is illuminated with $P_H$, its temperature rises up to $T_H$ ($T_H > T_L$).

The area of the medium thus heated by illumination with a laser beam spot starts to cool when the illumination ends. FIG. 2A shows schematically how the magnetization of each layer is reversed in this cooling process; the upper column shows the state of magnetization reversal during cooling after illumination with $P_L$ and the lower column refers to cooling after illumination with $P_H$.

Before describing in detail the changes of magnetization that are shown in FIG. 2A, let us make a brief review of the basic properties of rare earth/transition metal (hereunder designated RE-TM) systems which are commonly used as magnetooptical materials. RE-TM systems are generally referred to as ferrimagnetic materials and RE is bound to TM in such a way that their magnetizations cancel each other (i.e., in an antiparallel fashion). Hence, the overall magnetization is oriented in the direction of whichever the greater of the magnetizations of RE and TM and its strength is determined by the difference between the two magnetizations. If the magnetization of RE is the stronger, the magnetooptical material of interest is said to be "RE dominant" and, in the opposite case, it is said to be "TM dominant". A composition where the overall magnetization is zero is given a special name, "compensated composition". As the temperature increases, the magnetizations of both RE and TM decrease; however, since the magnetization of RE decreases more rapidly than the magnetization of TM, there is a tendency for the overall magnetization to shift from "RE dominant" to "TM dominant" state as the temperature increases.

In the next place, we describe the properties of a multilayered film in which the individual layers are bound exchange force. "Exchange force" refers to the force that works between adjacent magnetic layers in such a way that the direction of magnetization of TM in one layer is parallel to that of magnetization of TM in the adjacent layer. Take, for example, the case where the magnetization of TM in the fourth layer is directed downward; then, exchange force acts in such a way TM in the third layer will be magnetized in the same direction (downward). Needless to say, the magnetization of TM is antiparallel to that of RE in each layer, one may as well say that exchange force acts in such a way as to create parallelism in the magnetization of RE in two adjacent layers.

Going back to FIG. 2A, we now describe the mechanism of overwriting. The direction of arrow in each of the layers shown in FIG. 2A refers to the direction of magnetization of TM in each layer.

At room temperature, the magnetization of TM is directed upward in each of the four layers 4–7, except that magentization in the first layer 4 is directed either upward or downward depending upon the binary-level information to be recorded (State 3 or 7).

When the information to be recorded is "0" (i.e., if the magnetization of TM in the first layer is to be directed upward), a laser beam having intensity $P_L$ is applied and the temperature of the medium will rise to $T_L$ ($\geq Tc1$). Since $T_L$ is higher than the Curie points of both the first layer 4 and the third layer 6, their magnetization disappears (State 1). If the medium is cooled to a temperature below Tc1, the magnetization of TM in the first layer 4 is so oriented by exchange force that it is directed downward, i.e., parallel to the magnetization of TM in the second layer (State 2). If cooling proceeds until the temperature is close to room temperature, the first layer 4 becomes stable and the recording of "0" is completed (State 3).

When the information to be recorded is "1" (i.e., if the magnetization of TM in the first layer is to be directed downward), a laser beam having intensity $P_H$ is applied and the temperature of the medium will rise to $T_H (\geq Tc2)$. Since $T_H$ is higher than the Curie points of the first, second and third layers 4-6, their magnetization disappears (State 4). If the medium is cooled to a temperature below Tc2, it is magnetized in a downward direction by Hb, or magnetization applied externally in a downward direction. At the WRITE temperature under consideration, the second layer 5 is TM dominant, so the magnetization of TM is directed downward as is the overall magnetization (State 5). In this state, the magnetization of the third layer 6 having the lowest Curie point has of course disappeared and this blocks the exchange force acting from the fourth layer 7 to the second layer 5. If the third layer 6 were absent, the exchange force would act from the fourth layer 7 to the second layer 5. This is the force that will render the magnetization of TM in the second layer 5 to be directed upward in such a way as to impede the action of the bias magnetic field Hb. Therefore, it is due to the presence of the third layer 6 that binary-level information can be smoothly written into the second layer 5 in State 5 even in a small bias magnetic field Hb.

If cooling proceeds further than State 5 and the temperature becomes lower than Tc1, the Curie point of the first layer 4, the exchange force acts to orient the magnetization of TM in the first layer 4 in such a way that it is directed downward in alignment with the magnetization of TM in the second layer 5 (State 6). If the temperature further decreases to become lower than Tc3, the Curie point of the third layer 5, the exchange force starts to act from the fourth layer 7 to the third layer 6, orienting the magnetization of TM in the third layer 6 to be directed upward. The exchange force also starts to act from the third layer 6 to the second layer 5, reverting the magnetization of TM in the second layer 4 to be directed upward (State 7). In this state, the exchange force also acts from the second layer 5 to the first layer 4; however, the first layer 4 becomes very stable as room temperature is approached, so that it overcomes the exchange force to retain the present direction of magnetization, whereby the recording of "1" is completed.

As described above, the recording of "0" or "1" is accomplished by modulating the intensity of a laser beam to $P_L$ or $P_H$. In other words, direct overwriting is performed by light modulation.

However, the prior art magnetooptical recording media have the following various problems.

(i) First, they require a separate source of generating a bias magnetic field in a recording mode and this has increased the complexity of the equipment.

The present invention has been accomplished in order to solve this problem and has as an object providing a magnetooptical recording medium that is capable of light-modulated direct overwriting without requiring any separate source of generating a magnetic field.

(ii) A second problem with the prior art magnetooptical recording media is that the exchange force acting between the first and second magnetic layers is strong at a temperature where the magnetization of the first layer is aligned to the direction of magnetization of sublattices of transition metals in the second layer whereas it is necessary to reduce the exchange force acting between the first and second magnetic layers in the process of initialization at a temperature near room temperature and because of this small latitude in adjusting the thickness of the first and second magnetic layers, it has been difficult to achieve consistent production of reliable magnetooptical recording media.

The present invention has been accomplished in order to solve this problem and has as an object providing a magnetooptical recording medium that is capable of effectively controlling the exchange force acting between the first and second magnetic layers.

(iii) The prior art magnetooptical recording media use magnetic layers typically made of TbFeCo in consideration of several factors including the exchange force acting between the first and second magnetic layers.

For achieving higher-density recording, extensive studies are being made by designers of magnetooptical recording apparatus to shorten the operating wavelength of the optical head (i.e., semiconductor laser) which is used in both recording and reproduction modes. The prior art magnetooptical recording media have a sufficient Kerr magnetooptical effect for satisfactory reproduction output at or near 800 nm which is currently used to operate the optical head but if the operating wavelength is reduced by half to 400 nm, the angle of rotation will decrease to less than a half of the value that is achievable at 800 nm and no satisfactory reproduction output can be obtained.

The present invention has been accomplished in order to solve this problem and has as an object providing a magnetooptical recording medium that is capable of light-intensity modulated direct overwriting and that yet achieves satisfactory reproduction output even at an operating wavelength of 400 nm which is one half the currently employed value.

(iv) A further problem with the prior art magnetooptical recording media capable of light-modulated direct overwriting is that they require a strong bias magnetic field in order to compensate for the spurious magnetic field originating from the fourth layer. In addition, the magnetization of the fourth layer is reversed during illumination with $P_H$, thereby making it impossible to perform another overwriting.

The present invention has been accomplished in order to solve this problem and has as an object providing a magnetooptical recording medium that is capable of direct overwriting in a weak bias magnetic field and which yet is characterized by the greater stability of the fourth layer under illumination with $P_H$.

SUMMARY OF THE INVENTION

Those objects of the present invention can be attained by the following magnetooptical recording media.

1. A magnetooptical recording medium capable of direct overwriting by light intensity modulation according to the present invention may have four vertically anisotropic magnetic layers superposed on a substrate, with each two adjacent layers being bound by exchange force, and further having a fifth magnetic layer not bound by exchange force provided over the fourth magnetic layer.

This magnetooptical recording medium may be formulated such that the fifth magnetic layer has a Curie point of at least 300° C.

Another magnetooptical recording medium that is capable of direct overwriting by light intensity modulation according to the present invention, having four vertically anisotropic magnetic layers superposed on a substrate, with each two adjacent layers being bound by exchange force, may also have a layer made of a rare earth element/transition metal alloy in which the magnetization of sublattices of rare earth elements is dominant provided between the first and second magnetic layers which are bound together by exchange force.

Yet another magnetooptical recording medium capable of direct overwriting by light intensity modulation according to the present invention, having four vertically anisotropic magnetic layers superposed on a substrate, having with each two adjacent layers being bound by exchange force, may further include a layer made of a Nd containing rare earth element/transition metal alloy film that is adjacent the first magnetic layer into which a light beam is first admitted and that is arranged in the direction of light illumination, said layer being bound to the first magnetic layer by exchange force.

Yet another magnetooptical recording medium according to the present invention includes a Nd-containing rare earth element/transition metal alloy film made of NdTbFeCo, NdDyFeCo or NdGdFeCo, with Nd being added in an amount of up to 20 atm.% of FeCo.

Yet another magnetooptical recording medium that is capable of direct overwriting by light intensity modulation according to the present invention, having four vertically anisotropic magnetic layers superposed on a substrate, with each two adjacent layers being bound by exchange force, may further include a magnetic layer that is adjacent the first magnetic layer into which a light beam is first admitted and that consists of alternate films of Pt or Pd and Co in superposition, said layer being bound to the first magnetic layer by exchange force.

This magnetooptical recording medium may be formulated such that the magnetic layer that consists of alternate films of Pt or Pd and Co in superposition has a Curie point lower than that of the first magnetic layer.

Yet another magnetooptical recording medium that is capable of direct overwriting by light intensity modulation according to the present invention, having four vertically anisotropic magnetic layers superposed on a substrate, with each two adjacent layers being bound by exchange force, may also have a fifth magnetic layer bound by exchange force is provided on the fourth magnetic layer, each of said fourth and fifth magnetic layers being composed of a rare earth element/transition metal alloy, said fourth layer being transition metal dominant at room temperature whereas said fifth layer being rare earth element dominant at room temperature.

BRIEF DESCRIPTION OF THE DRAWINGS

FIG. 8 is a schematic diagram showing the basic structure for a magnetooptical recording medium according to yet another embodiment of the present invention;

FIG. 14A and B show the results obtained when magnetization was enhanced in areas around the center of an applied laser beam spot;

DETAILED DESCRIPTION OF THE INVENTION

A first embodiment of a magnetooptical recording medium according to the present invention has a bias magnetic layer that generates a magnetic field in a recording mode, whereby binary-level information is written into the second layer. Hence, this recording medium can be operated without an external bias magnetic field that has been necessary in the prior art.

This embodiment may include that a rare earth element/transition metal alloy layer in which the magnetization of sublattices of rare earth elements dominant is provided between the first and second magnetic layers. Hence, a magnetooptical recording medium capable of direct overwriting by light modulation can be produced in a consistent manner.

A second embodiment of a magnetooptical recording medium according to the present invention may include a layer formed of a Nd-containing rare earth element/- transition metal alloy film that is bound to the first magnetic layer by exchange force is formed adjacent the first magnetic layer. Hence, this embodiment is capable of direct overwriting by light intensity modulation and yet it yields satisfactory reproduction output even at shorter wavelengths.

A third embodiment of a magnetooptical recording medium according to the present invention may include a magnetic layer (the zeroth magnetic layer) consisting of alternate films of Pt or Pd and Co that is bound to the first magnetic layer by exchange force is formed adjacent the first magnetic layer. Hence, this embodiment is capable of direct overwriting by light intensity modulation and yet it yields satisfactory reproduction output even at shorter wavelengths.

A fourth embodiment of a magnetooptical recording medium according to the present invention may have the fourth layer of a prior art version divided into two layers of different composition. The required bias magnetic field is accordingly reduced and the fourth layer consisting of two sub-layers is more stable than the conventional fourth layer during illumination with $P_H$.

Figure 1:
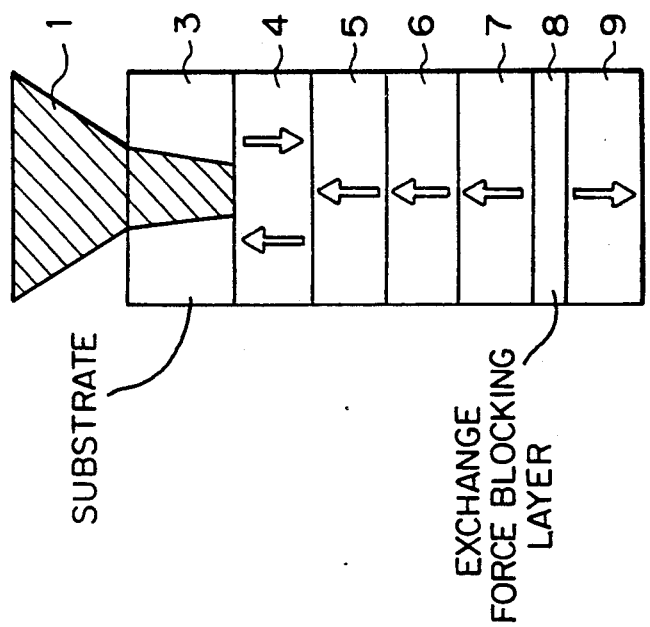
FIG. 1 is a schematic diagram showing the basic structure for a prior art magnetooptical recording medium.
Figure 3:
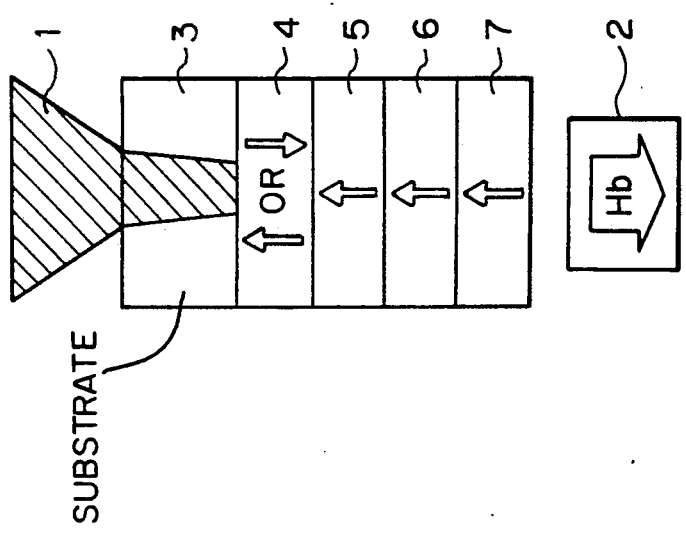
FIG. 3 is a schematic diagram showing the basic structure for a magnetooptical recording medium according to an embodiment of the present invention.

The first embodiment of the present invention is described below in greater detail with reference to FIG. 3, in which numerals 1 and 3–7 denote the same components as in the prior art version shown in FIG. 1. Shown by 8 in FIG. 3 is a nonmagnetic layer for blocking the exchange force acting between two adjacent magnetic layers, and 9 is a bias magnetic layer. Like the fourth layer 7, the bias magnetic layer 9 has such a large coercive force and high Curie point that it will not experience reversal of magnetization during recording or reproduction. After film formation, the bias magnetic layer 9 is magnetized with an electromagnet or by some other means in order to orient the magnetization of TM in such a way that it is directed downward. This direction of magnetization will thereafter be retained almost indefinitely.

EXAMPLE 1

Layers having the following thicknesses and compositions were superposed:

| | | |
|---|---|---|
| First layer 4: | $Tb_{22}(Fe_{90}Co_{10})_{78}$ | 500 Å |
| Second layer 5: | $(Gd_3Tb_{70})_{25}(Fe_{70}Co_{30})_{75}$ | 1000 Å |
| Third layer 6: | $Tb_{18}(Fe_{95}Co_5)_{82}$ | 100 Å |
| Fourth layer 7: | $Tb_{25}Co_{75}$ | 400 Å |
| Nonmagnetic layer 8: | SiN | 50 Å |
| Bias layer 9: | $Tb_{26}Co_{73}$ | 2000 Å |

The first to the fourth layers 4–7 were virtually the same as in the prior art version. The bias layer 9 was magnetized in opposite direction to the foruth layer 7 but the exchange force acting between them was blocked by the nonmagnetic layer 8, so they could retain their directions of magnetization in a stable manner.

Figure 2A:
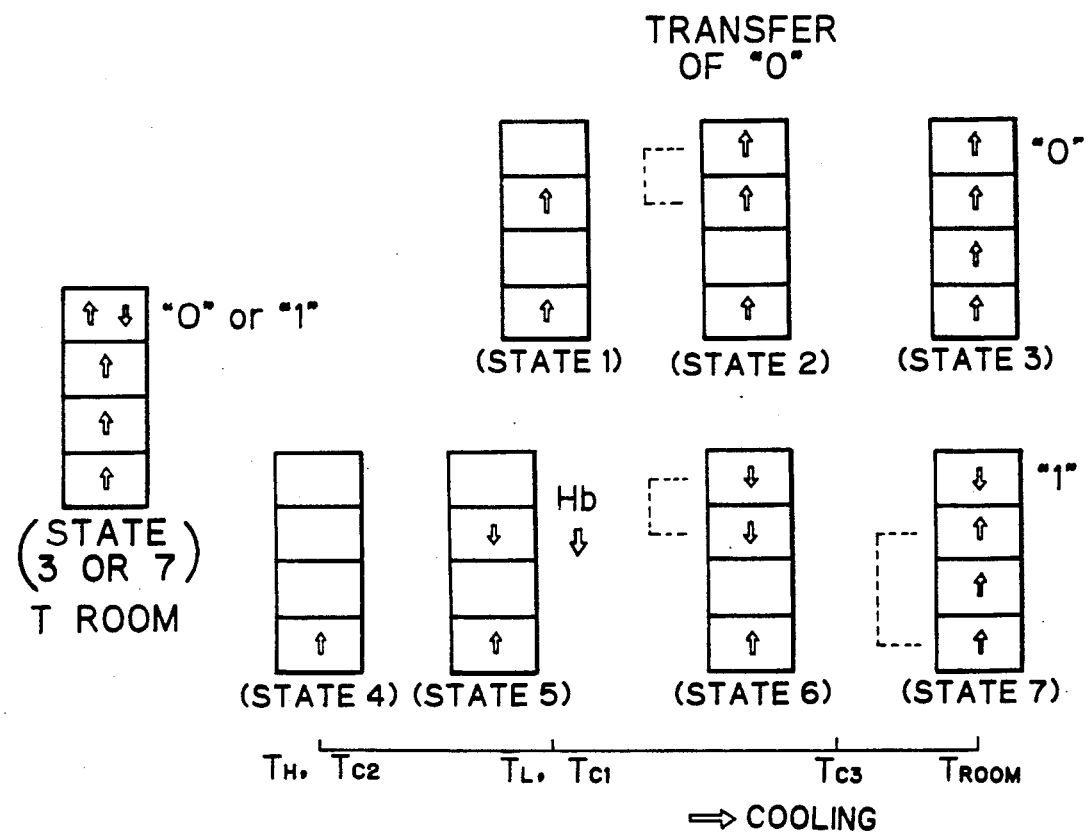
FIG. 2A illustrates the mechanism of direct overwriting with a magnetooptical recording medium by showing the changes of magnetization of each magnetic layer in a recording mode.
Figure 2B:
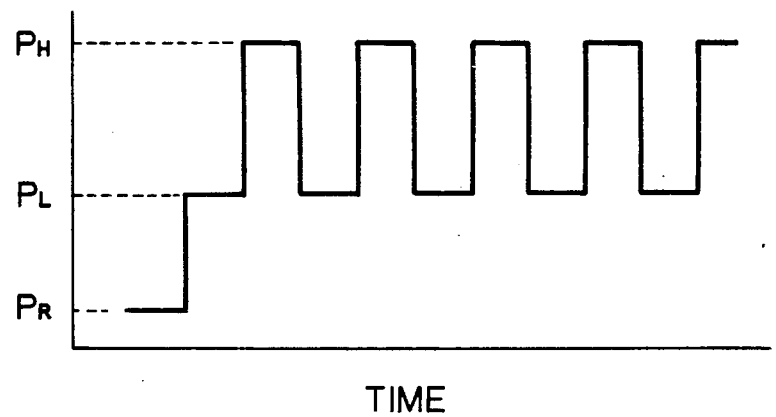
FIG. 2B illustrates the mechanism of direct overwriting by showing the intensity profiles of a laser beam in a reproduction and a recording mode.

The mechanism of overwriting in the medium shown in FIG. 3 is essentially the same as in the prior art version except that the external bias magnetic field applied in State 6 (in writing mode) in FIG. 2A is replaced by the magnetic field generated by the bias layer 9.

Figure 4:
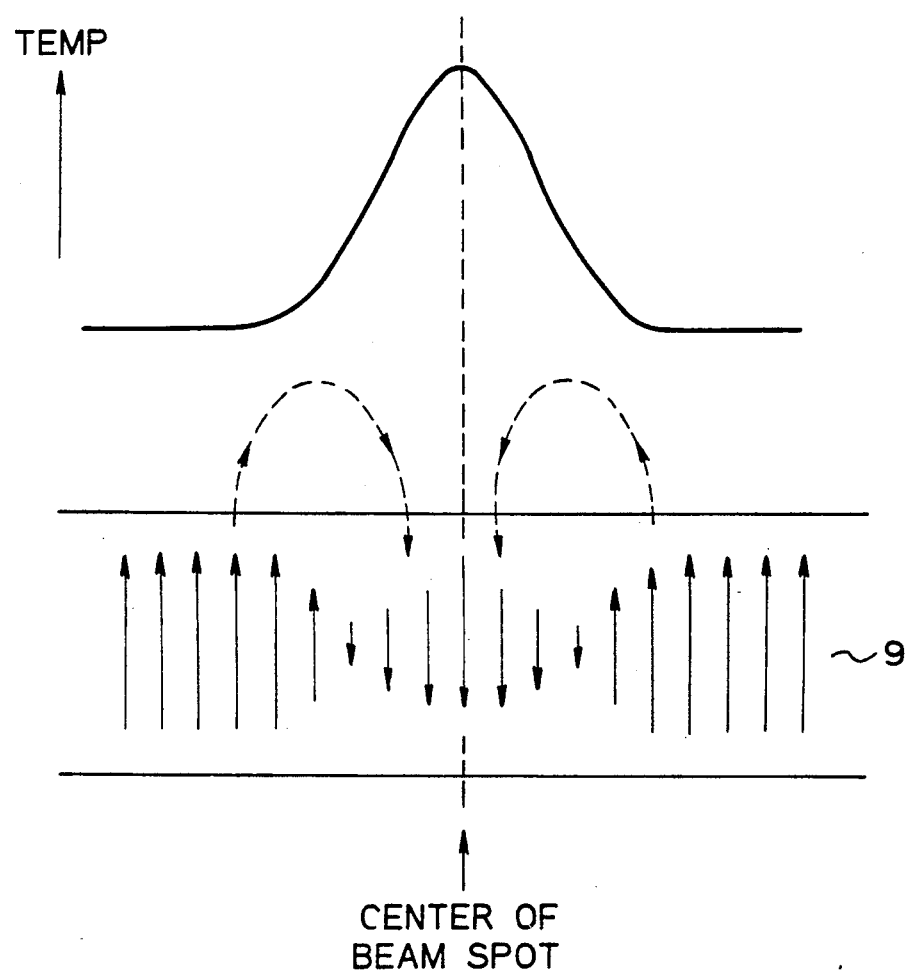
FIG. 4 illustrates the mechanism of generating magnetic field in the magnetooptical recording medium shown in FIG. 3.

The mechanism by which a magnetic field is generated from the bias layer 9 is described below with reference to FIG. 4. At room temperature, the bias layer 9 is RE dominant, the magnetization of TM is directed downward, so the overall magnetization is directed upward. Upon illumination with a laser beam, a temperature profile develops as shown in FIG. 4, in which the temperature of the medium is the highest at the center of the beam spot and gradually approaches room temperature with increasing distance from the center of the beam spot. At the temperature around the center of the beam spot, TM is dominant and RE becomes increasingly dominant as the distance from the center of the beam spot increases. The resulting magnetization profile is as shown in FIG. 4. The magnetic field generated from this magnetization profile is in the direction indicated by dashed lines in FIG. 4. Obviously, the generated magnetic field is directed downward in areas near the center of the beam spot and it serves as an effective substitute for the conventional source of generating an external bias magnetic field.

Thus, according to the present invention, light-modulated overwriting could be accomplished without an external magnetic filed, or source of generating an external bias magnetic field.

EXAMPLE 2

The nonmagnetic layer 8 used in Example 1 could also be formed of a dielectric material such as $SiO_2$. Instead of forming a separate nonmagnetic layer, the following approach could be taken: after the first to the fourth layers 4–7 were formed, the sample was taken out of the film forming apparatus and exposed to the ambient atmosphere so as to oxidize the surface of the fourth layer 7 and, thereafter, the bias layer 9 was formed. In this way, the exchange force acting between the fourth layer 7 and the bias layer 9 was blocked by the oxidized surface of the fourth layer 7 and satisfactory overwriting operations could be performed.

Figure 5:
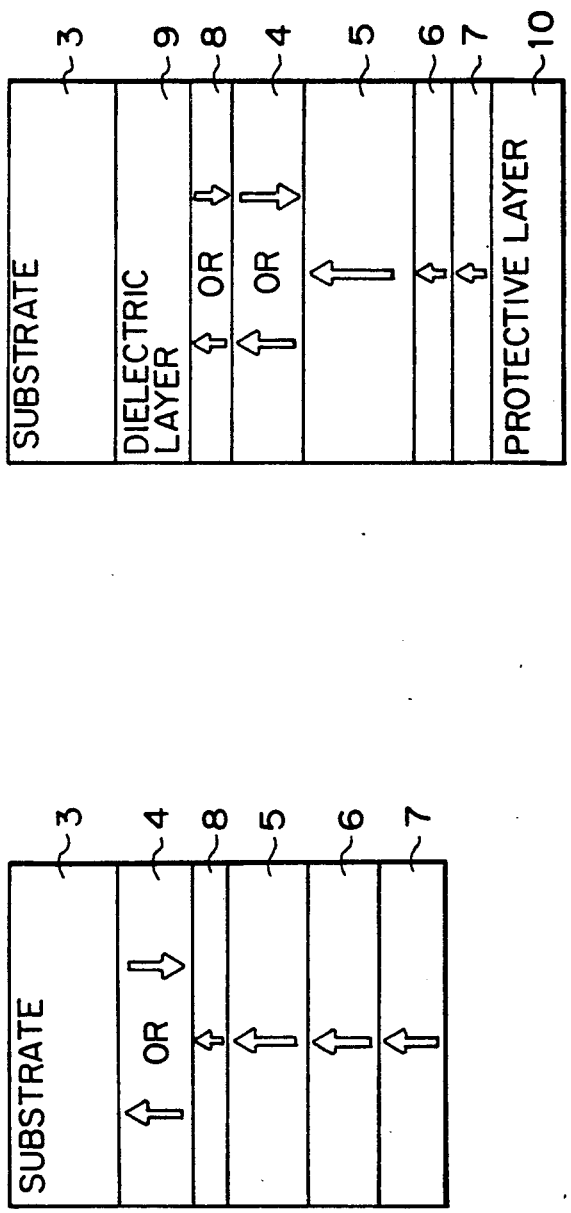
FIG. 5 is a schematic diagram showing the basic structure for a magnetooptical recording medium according to another embodiment of the present invention.

FIG. 5 is a schematic diagram showing the basic structure for a magnetooptical recording medium as recited in appended claim 3. As shown, the medium consists of a transparent glass or plastic substrate 3 which is overlaid with four magnetic layers 4–7 that are bound together by exchange force, with a fifth magnetic layer 8 being inserted between the first magnetic layer 4 and the second magnetic layer 5. In the example shown below, the first magnetic layer 4, the fifth magnetic layer 8 and the second magnetic layer 5 were successively formed on the transparent substrate 3 by sputtering.

EXAMPLE 3

| | |
|---|---|
| Substrate | 1.2 mm thickness glass substrate with the groove |
| Dielectric layer | SiNx |
| First magnetic layer | ternary TbFeCo amorphous alloy $Tb_{22}Fe_{69}Co_9$ thickness, 600 Å |
| Fifth magnetic layer | binary GdFe amorphous alloy $Gd_{25}Fe_{75}$ thickness, 50 Å |
| Second mangetic layer | quaternary GdDyFeCo amorphous alloy $Gd_8Dy_{17}Fe_{60}Co_{15}$ thickness, 1000 Å |
| Third magnetic layer | ternary TbFeCo amorphous alloy $Tb_{18}Fe_{82}$ thickness, 200 Å |
| Fourth magnetic layer | binary TbCo amorphous alloy $Tb_{30}Co_{70}$ thickness, 400 Å |
| Protective layer | SiNx |

An experiment was conducted to evaluate the performance of the magnetooptical recording medium of Example 3 in direct overwriting by light modulation. When a signal having a bit length of 0.76 μm was directly written over a signal having a bit length of 2 μm at a linear speed of 11 m/sec in an applied magnetic field of 300 Oe with a light beam modulated for an intensity of 13 mW or 5 mW, a CN ratio of 47 dB was attained with the erase ratio being at least 40 dB.

Figure 6:
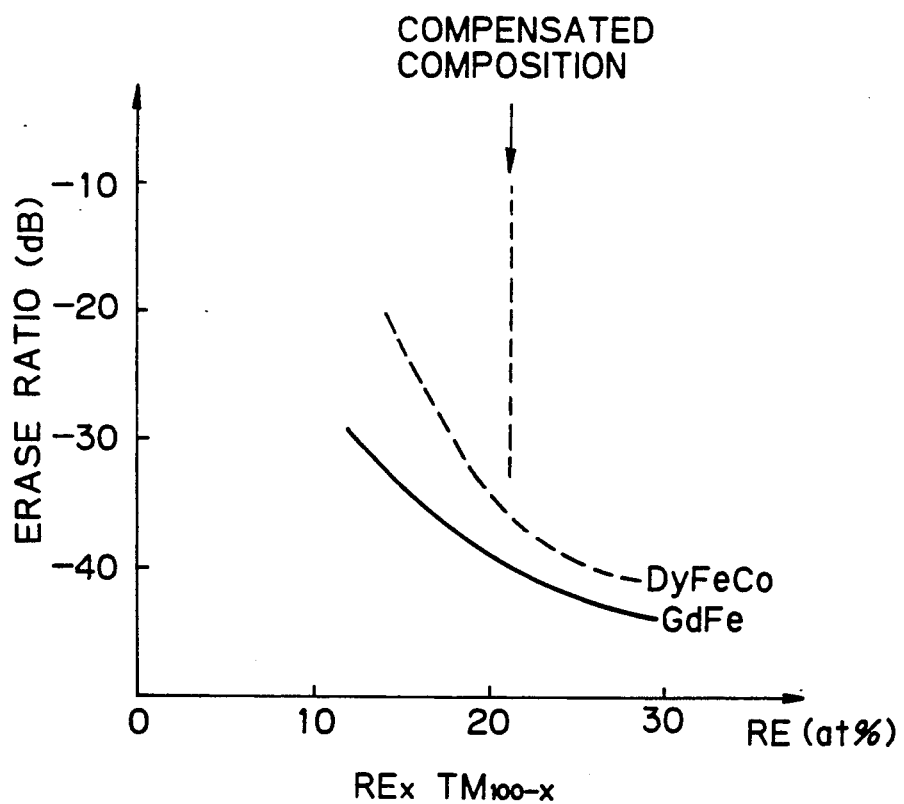
FIG. 6 is a graph showing the dependency of erase ratio after direct overwriting on the proportion of rare earth (RE) element in the fifth magnetic layer.

FIG. 6 shows the dependency of the erase ratio after this direct overwriting experiment of the proportion of RE in the fifth magnetic layer which was made of GdFe or DyFeCo. As one can see from FIG. 6, satisfactory values of erase ratio (>40 dB) were obtained with compositions in which the magnetization of sublattices of rare earth elements was dominant, namely, at RE proportions of at least 21 atm.% where the compensated composition occurred. The fifth magnetic layer may be made of other alloy systems of a rare earth element and a transition metal, as exemplified by GdFeCo, GdCo and HoCo.

The thickness of the fifth magnetic layer is desirably in the range of ca. 5-100 Å.

Figure 7:
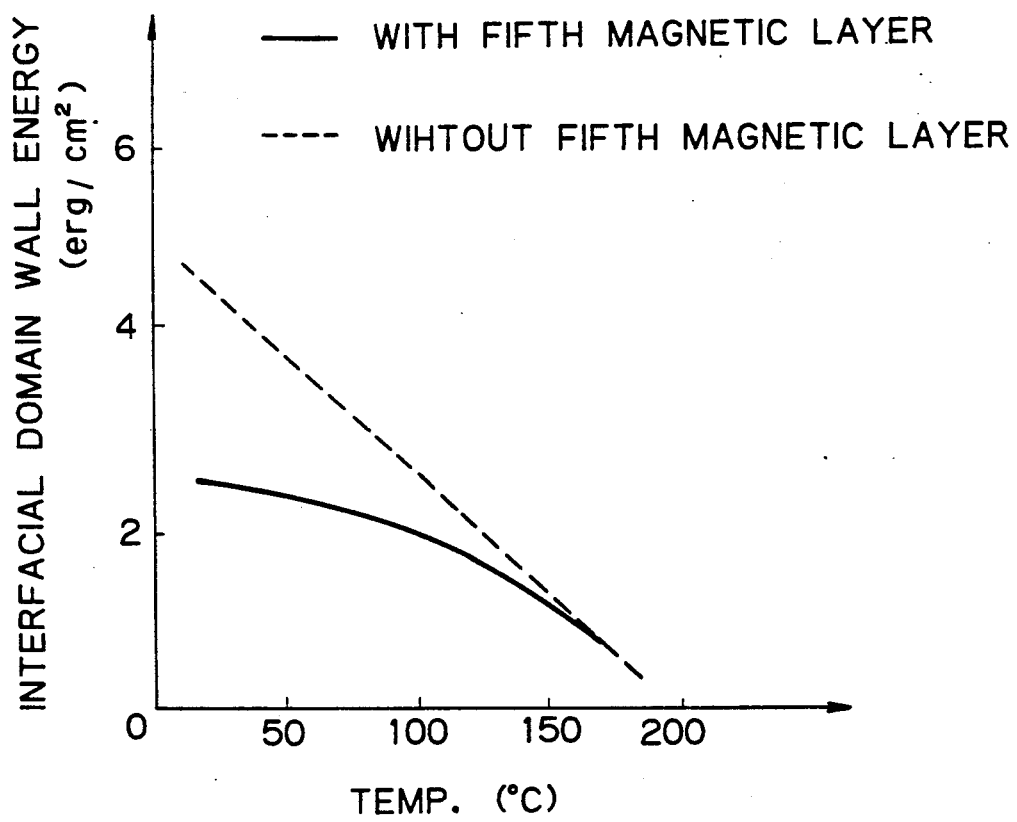
FIG. 7 shows the temperature dependency of the domain wall energy at the interface between the first and second magnetic layers.

FIG. 7 is a graph in which the temperature dependency of the domain wall energy that determines the exchange force acting between the first and second magnetic layers is shown for two cases, one in which the fifth magnetic layer was provided and the other in which no fifth magnetic layer was used. One can see from FIG. 7 that by providing the fifth magnetic layer, the interfacial domain wall energy at temperatures near room temperature could be sufficiently reduced to provide improved recording characteristics. In addition, the latitude in fabrication is sufficiently increased to improve the production rate of magnetooptical recording media.

FIG. 8 is a schematic diagram showing the basic structure for magnetooptical recording medium as recited in appended claims 4 and 5, or claims 6 and 7. As shown, the medium consists of a transparent glass or plastic substrate 3 which is overlaid with four magnetic layers 4-7 that are bound together by exchange force, with a zeroth magnetic layer 9 being inserted between a dielectric layer 9 and the first magnetic layer 4. In the example shown below, the zeroth magnetic layer 8, the first magnetic layer 4 and the second magnetic layer 5 were successively formed on the transparent substrate 3 by sputtering. Shown by 10 in FIG. 8 is a protective layer.

EXAMPLE 4

| Substrate | 1.2 mm thickness glass substrate with the groove |
|---|---|
| Dielectric layer | SiNx |
| Zeroth magnetic layer | quaternary NdTbFeCo amorphous alloy $Nd_{10}Tb_{10}Fe_{40}Cp_{40}$ thickness, 100 Å |
| First magnetic layer | ternary TbFeCo amorphous alloy $Tb_{22}Fe_{69}Co_9$ thickness, 600 Å |
| Second magnetic layer | quaternary GdDyFeCo amorphous alloy $Gd_8Dy_{17}Fe_{60}Co_{15}$ thickness, 1000 Å |
| Third magnetic layer | ternary TbFeCo amorphous alloy $Tb_{18}Fe_{82}$ thickness, 200 Å |
| Fourth magnetic layer | binary TbCo amorphous alloy $Tb_{30}Co_{70}$ thickness, 400 Å |
| Protective layer | SiNx |

An experiment was conducted to evaluate the performance of the magnetooptical recording medium of Example 4 in direct overwriting by light modulation. When a signal having a bit length of 0.76 μm was written over a signal having a bit length of 2 μm at a linear speed of 11 m/sec in an applied magnetic field of 300 Oe with a light beam modulated for an intensity of 13 mW or 5 mW, a CN ratio of 47 dB was obtained by reproduction with light having a wavelength of 532 nm.

A similar measurement was performed with a comparative sample which was the same as the magnetooptical recording medium of Example 4 except that the zeroth magnetic layer was omitted. The CN ratio obtained was 40 dB.

Figure 9:
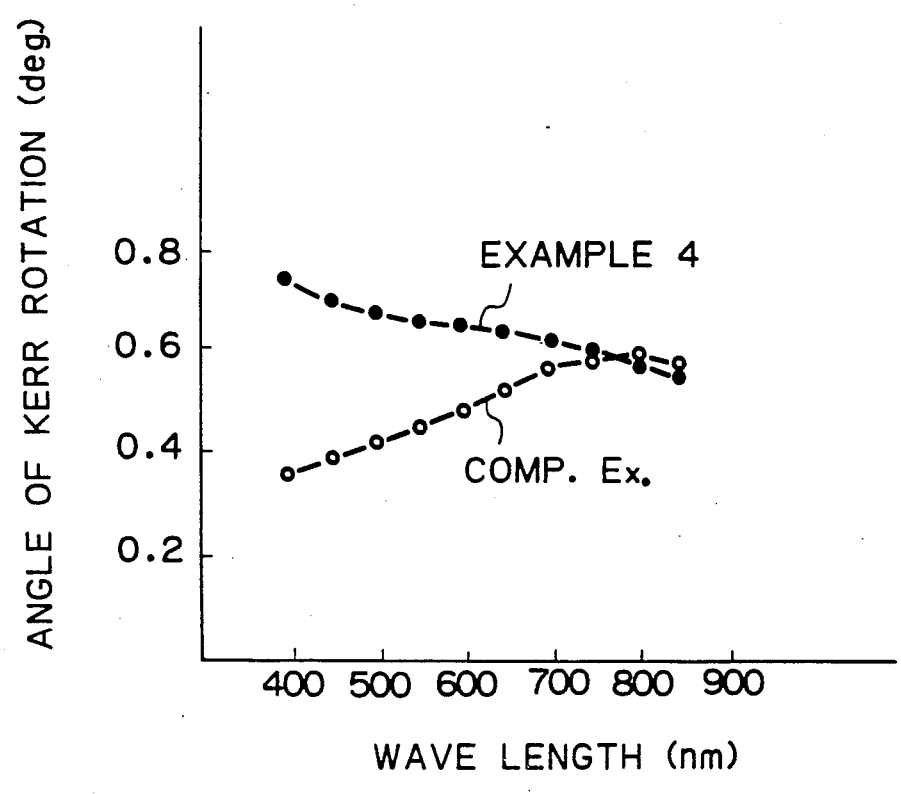
FIG. 9 is a graph showing the wavelength dependency of the angle of Kerr rotation for the magnetooptical recording media of Example 4 and Comparative Example.

FIG. 9 is a graph showing the wavelength dependency of the angle of Kerr rotation for the magnetooptical recording media of Example 4 and Comparative Example. The two samples showed similar angles of Kerr rotation at wavelengths near 800 nm but at wavelengths of 400-500 nm, the sample of Example 4 showed angles about twice as many as the values exhibited by the comparative sample.

Figure 10:
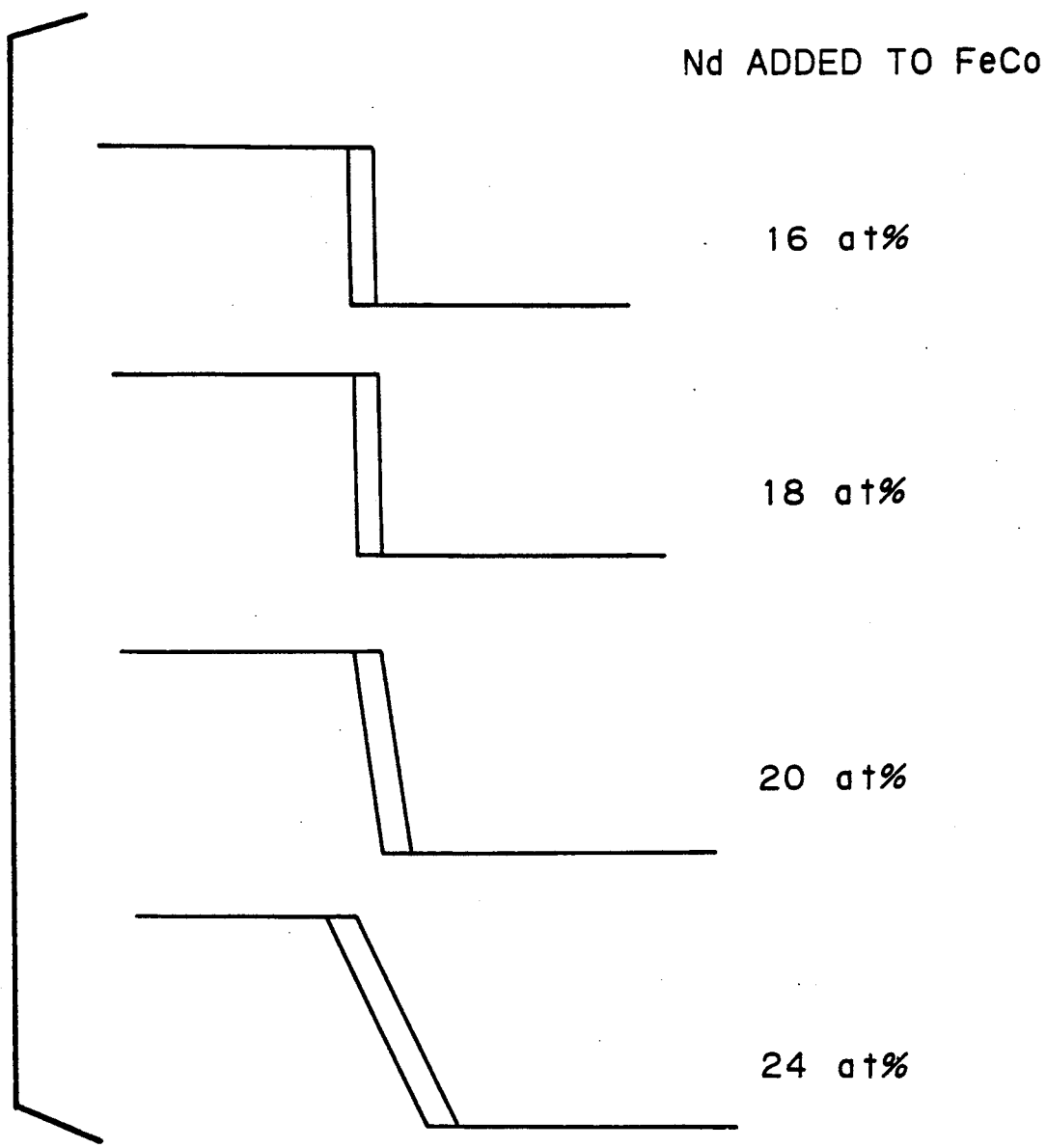
FIG. 10 shows the Kerr loops obtained when the amount of addition of Nd to FeCo in the zeroth magnetic layer was adjusted to various values.

FIG. 10 shows the Kerr loops obtained when the amount of addition of Nd to FeCo in the zeroth magnetic layer was adjusted to various values. When the amount of Nd relative to FeCo exceeded 20 atm. %, the slope of the Kerr loop decreased so much that it became impossible to maintain recording bits in a stable manner and the increasing noise prevented the accomplishment of high CN ratios. It is therefore recommended that the amount of Nd relative to FeCo not exceed 20 atm. %.

In Example 4, the zeroth magnetic layer was made of NdTbFeCo but similar results were obtained with NdDyFeCo and NdGdFeCo.

EXAMPLE 5

| Substrate | 1.2 mm thickness glass substrate with the groove |
|---|---|
| Dielectric layer | SiNx |
| Zeroth magnetic layer | laminated Pt/Co magnetic film Pt (20 Å)/Co (5 Å) thickness, 150 Å |
| First magnetic layer | ternary TbFeCo amorphous alloy $Tb_{22}Fe_{69}Co_9$ thickness, 600 Å |
| Second magnetic layer | quaternary GdDyFeCo amorphous alloy $Gd_8Dy_{17}Fe_{60}Co_{15}$ thickness, 1000 Å |
| Third magnetic layer | ternary TbFeCo amorphous alloy $Tb_{18}Fe_{82}$ thickness, 200 Å |
| Fourth magnetic layer | binary TbCo amorphous alloy $Tb_{30}Co_{70}$ thickness, 400 Å |
| Protective layer | SiNx |

An experiment was conducted to evaluate the performance of the magnetooptical recording medium of Example 5 in direct overwriting by light modulation. When a signal having a bit length of 0.76 μm was directly written over a signal having a bit length of 2 μm at a linear speed of 11 m/sec in an applied magnetic field of 300 Oe with a light beam modulated for an intensity of 13 mW or 5 mW, a CN ratio of 46 dB was obtained by reproduction with light having a wavelength of 532 nm.

Figure 11:
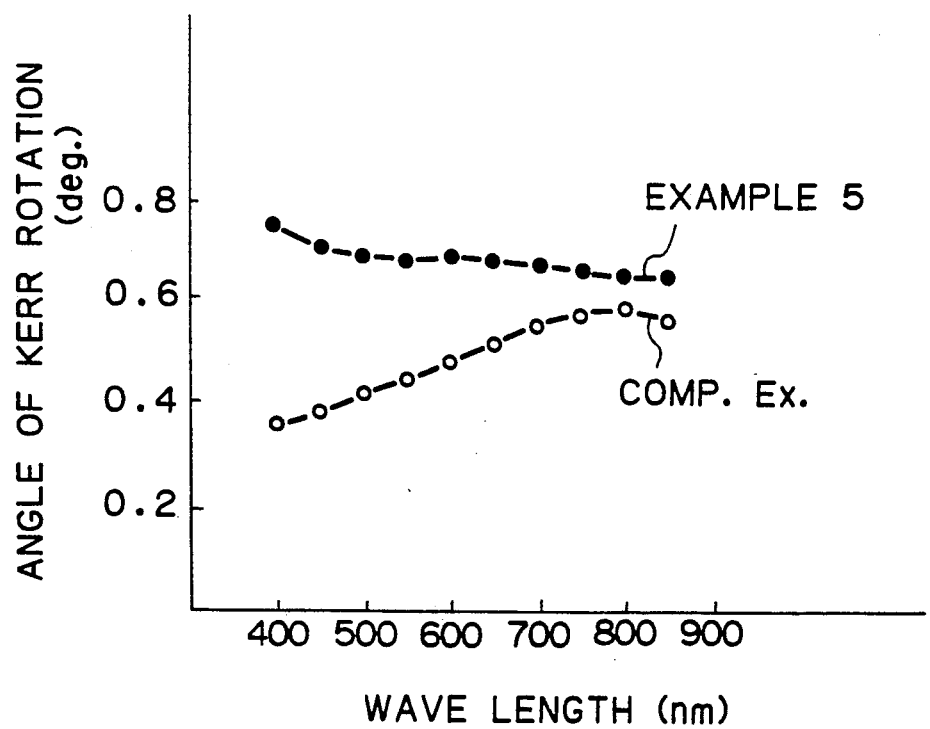
FIG. 11 is a graph showing the wavelength dependency of the angle of Kerr rotation for the magnetooptical recording media of Example 5 and Comparative Example.

FIG. 11 is a graph showing the wavelength dependency of the angle of Kerr rotation for the magnetooptical recording medium of Example 5 and comparative sample shown in FIG. 9. The difference between the two samples was small at wavelengths near 800 nm but at wavelengths of 400-500 nm, the sample of Example 5 showed angles of Kerr rotation about twice as many as the values exhibited by the comparative sample.

Figure 12:
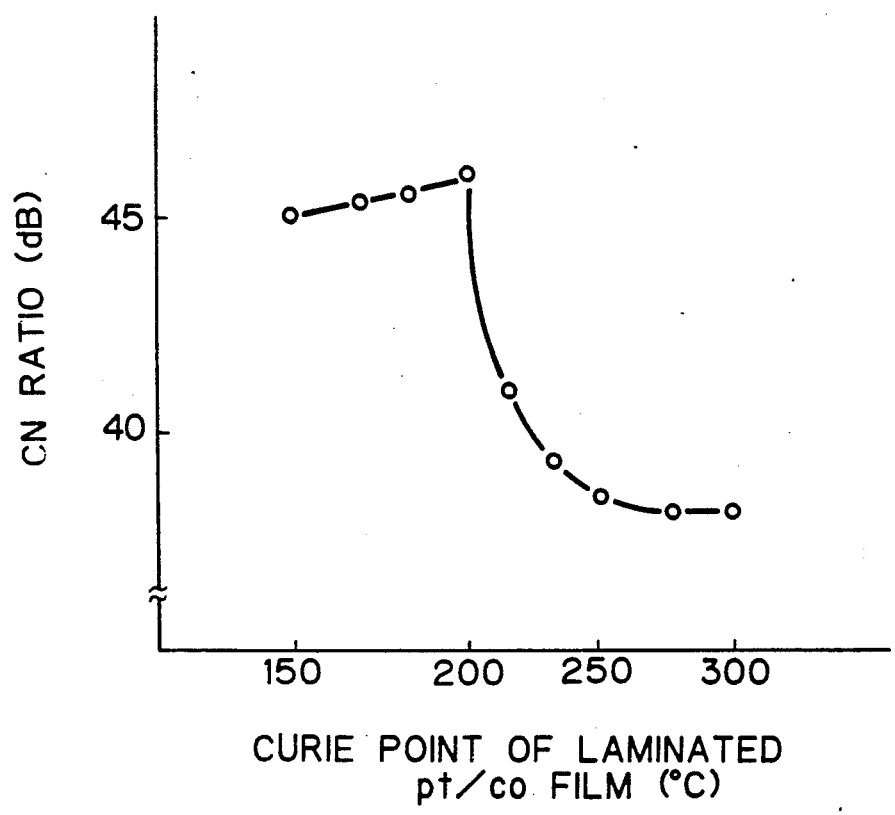
FIG. 12 is a graph showing the CN ratio vs Curie point profile of the zeroth magnetic layer in which the thickness of the laminated Pt/Co film was held constant but the Curie point of which was varied by adjusting the period of Pt and Co lamination.

FIG. 12 is a graph showing the CN ratio vs Curie point profile of the zeroth magnetic layer in which the thickness of the laminated Pt/Co film was held constant but in which the Curie point was varied by adjusting the period of Pt and Co lamination. Since the first magnetic layer has a Curie point of 200° C., the data in FIG. 12 shows that satisfactory characteristics are attained when the zeroth magnetic layer has a lower Curie point than the first magnetic layer. If the zeroth magnetic layer has a higher Curie point than the first magnetic layer, the bits recorded in the first magnetic layer are disturbed by the magnetization of the zeroth magnetic layer to cause increased noise. To avoid this problem, the Curie point of the zeroth magnetic layer is desirably lower than that of the first magnetic layer. In Example 5, the zeroth magnetic layer was made of a laminated Pt/Co film but similar results were obtained with a laminated Pd/Co film.

Figure 13:
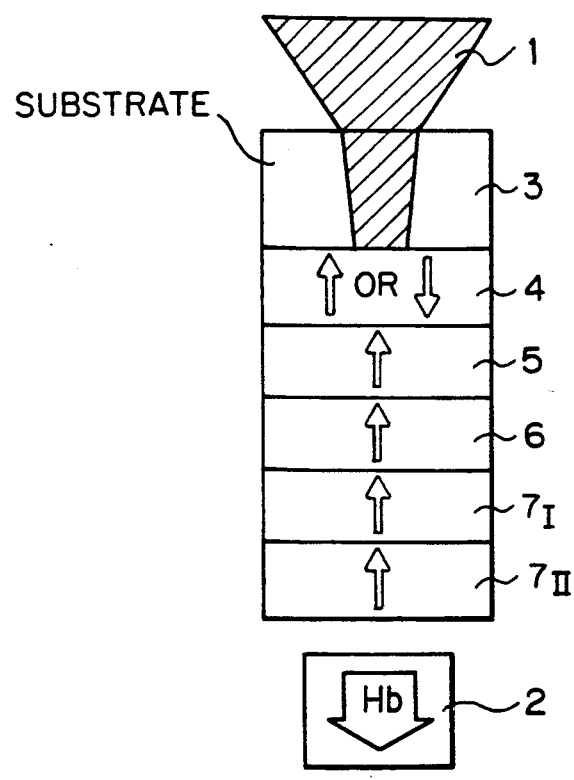
FIG. 13 is a schematic diagram showing the basic structure for a magnetooptical recording medium according to another embodiment of the present invention.

Another embodiment of the present invention as recited in appended claim 8 is described below with reference to FIG. 13, in which numerals 1–6 denotes the same components as in the prior art version. Shown by 8 is the first sub-layer I of the fourth layer and 9 is the second sub-layer II of the fourth layer. The two sub-layers are bound together by exchange force and the resulting layer works essentially in the same way as the fourth layer 7 of the prior art version. As in the prior art, the two sublayers 8 and 9, after being formed, are magnetized with an electromagnet or by some other means in order to insure that the magnetization of TM in each sub-layer is directed upward.

EXAMPLE 6

Layers having the following thicknesses and compositions were superposed:

| First layer 4: | $Tb_{22}(Fe_{90}Co_{10})_{78}$ | 500 Å |
|---|---|---|
| Second layer 5: | $(Gd_{30}Tb_{70})_{25}(Fe_{70}Co_{30})_{75}$ | 1000 Å |
| Third layer 6: | $Tb_{18}(Fe_{95}Co_{05})_{82}$ | 100 Å |
| Fourth layer 8 (I): | $Tb_{18}Co_{82}$ | 300 Å |
| Fourth layer 9 (II): | $Tb_{27}Co_{73}$ | 100 Å |

Except for the structure of the fourth layer, the magnetooptical recording medium of Example 6 is essentially the same as the prior art, including the operation of direct overwriting by light modulation. In the prior art version, the fourth layer 7 is composed of a single layer but in the medium of Example 6, the fourth layer is divided into two sub-layers 8 and 9. On the pages that follow, we will describe how this dual structure of the fourth layer affects the overwriting characteristics of the recording medium.

First, we discuss the effects of a spurious magnetic field with reference to FIG. 14. FIG. 14A shows the temperature dependency of the magnetization of the fourth layer 7 of the prior art magnetooptical recording medium as contrasted with the sub-layers 8 (I) and 9 (II) of the fourth layer in the sample of Example 6. FIG. 14B shows the state of magnetization of each of those layers in the center of an applied laser beam spot and nearby areas, together with the resulting temperature profile. As shown, the temperature of the area close to the center of the beam spot was 300° C. which corresponds to the maximum ultimate temperature that can be attained by illumination with $P_H$. The fourth layer 7 in the prior art version and the sub-layer 9 (II) in the sample of Example 6 are RE dominant at room temperature and as the temperature increases, they make a transition to the compensated composition and even to the TM dominant state. Hence, the overall magnetization is directed downward at room temperature and becomes directed upward as the temperature rises. At elevated temperatures, the spurious magnetic field in the area near the center of the beam spot is directed upward as indicated by dashed lines in FIG. 14B.

On the other hand, the sub-layer 8 (I) in the fourth layer of the medium of Example 6 is TM dominant at room temperature, so its magnetization is always directed upward at room temperature and above. The absolute value of magnetization in the hot area near the center of the beam spot is smaller than in the surrounding areas, with the spurious magnetic field in the hot area being directed downward.

As described above, the spurious magnetic field acting in the sub-layer 8 (I) is directed downward (in the same direction as the bias magnetic field) but in the sub-layer 9 (II) and the fourth layer 7, the spurious magnetic field is directed upward (in opposite direction to the bias magnetic field). The strength of the spurious magnetic field is proportional to the film thickness.

In the prior art example, the spurious magnetic field is obviously directed upward but in the sample of Example 6, the sub-layers 8 (I) and 9 (II) can be designed in such a way that the spurious magnetic fields that develop in those sub-layers cancel each other by adjusting their thicknesses. As a result, the net spurious magnetic field that occurred in the magnetooptical recording medium of Example 6 was substantially zero.

Figure 15:
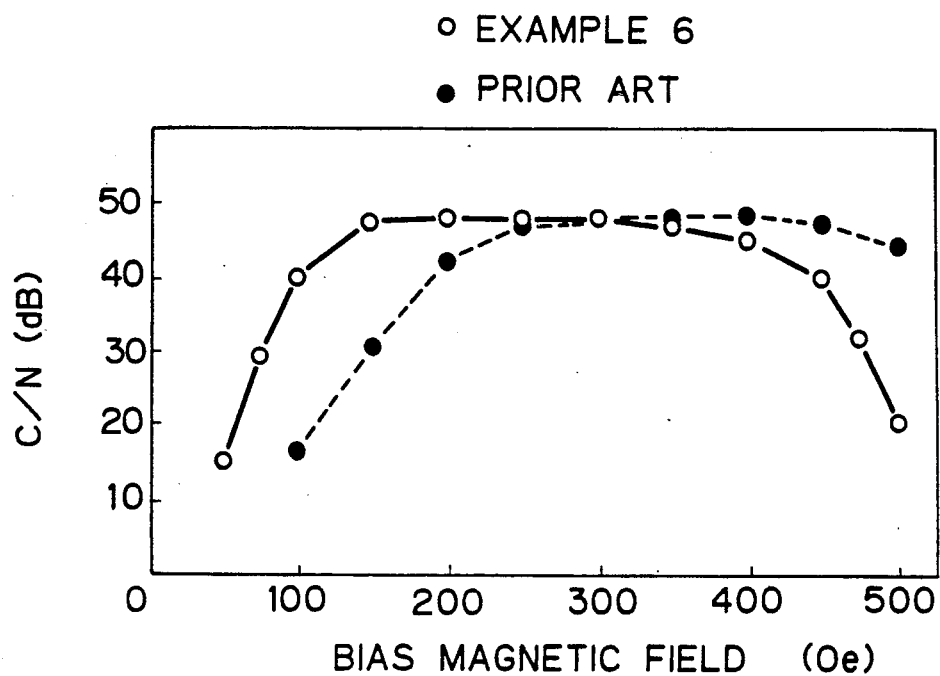
FIG. 15 is a graph comparing the magnetooptical recording medium of Example 6 of the present invention with a prior art version in terms of the dependency of CN ratio on bias magnetic field.

FIG. 15 is a graph showing the results of an experiment conducted for comparing the magnetooptical recording medium of Example 6 with the prior art version in terms of the dependency of CN ratio on bias magnetic field. In the experiment, a signal of 1 MHz was first recorded in a 60 mm $\phi$ area of a medium rotating at 1800 rpm and, thereafter, a signal of 3.7 MHz was written over the first signal and the resulting CN ratio was measured. In the prior art, a bias magnetic field of ca. 250 Oe has been necessary to attain a CN ratio of 45 dB which is held to be the minimum necessary level for performing digital recording but, in Example 6, a bias magnetic field of about 150 Oe was sufficient to perform digital recording. This data shows that the dual structure of the fourth layer was effective in reducing the spurious magnetic field by as much as 100 Oe.

There is another advantage of the embodiment under discussion. As already mentioned, the fourth layer 7 in the prior art magnetooptical recording medium has such a high Curie point and a large coercive force that it will not experience reversal of magnetization during recording. However, it has been found by experimentation that reversal of magnetization occurs in the fourth layer if it is illuminated with a very intense laser beam. Even if the laser beam applied is not very intense, reversal of magnetization can occur in the fourth layer 7 if overwriting is repeated for more than $10^5$ cycles. This phenomenon may be attributable to the "storage effect" that occurs in the recording medium as a result of cyclic illuminations with laser light.

In order to prevent the occurrence of magnetization reversal in the fourth layer 7 due to the phenomena described above, the heat stability of that layer must be increased. In other words, it is necessary to provide the fourth layer with such a characteristic that no reversal of magnetization will occur in that layer even if it is illuminated with intense laser light. To this end, the fourth layer 7 must have a large coercive force at elevated temperatures, namely, it must have a high compensation temperature. In order to increase the compensation temperature, it is desired that the composition of the fourth layer is RE dominant as much as possible at room temperature. However, as is well known, the more RE dominant the composition of a layer is, the more rapidly the exchange force for binding to an adjacent layer will decrease. Obviously, it becomes difficult to attain State 7 (see FIG. 1) if the exchange force acting between the fourth layer 7 and the third layer 6 decreases.

The dual structure of the fourth layer is also very effective for the purpose of solving the above-described problem. In this structure, the sub-layer 8 (I) which is TM dominant at room temperature is superposed on the third layer 6 to increase the exchange force for binding to the latter and the sub-layer 9 (II) which is extremely RE dominant at room temperature is superposed on the sublayer 8 (I) to increase the stability of the fourth layer at elevated temperatures.

Figure 16:
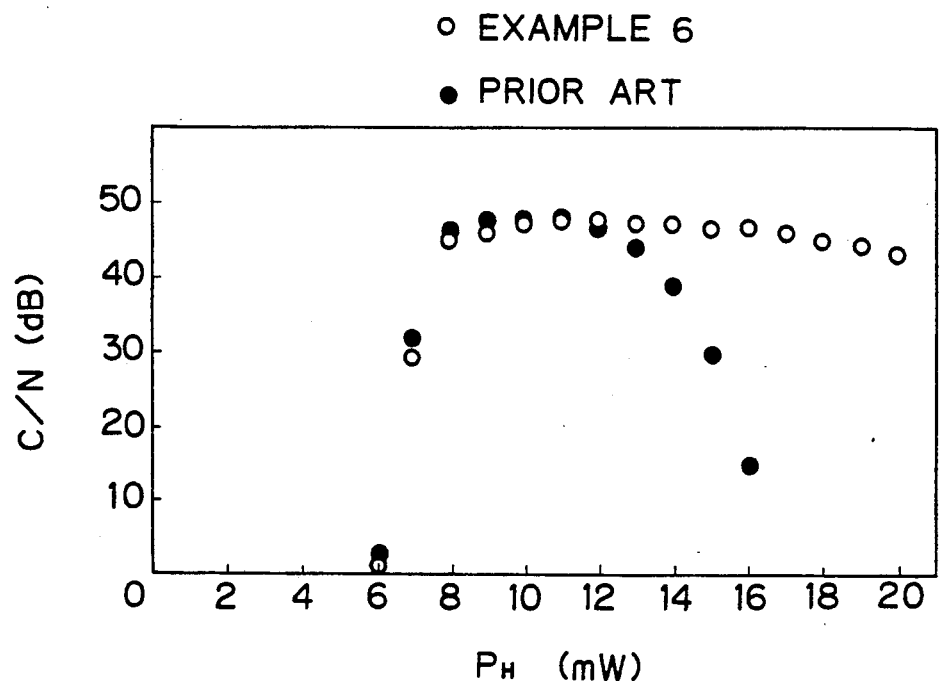
FIG. 16 is a graph comparing the magnetooptical recording medium of Example 6 of the present invention with a prior art version in terms of the dependency of CN ratio on $P_H$.

FIG. 16 is a graph comparing the magnetooptical recording medium of Example 6 with the prior art version in terms of the dependency of CN ratio on $P_H$. As one can see, from FIG. 16, the CN ratio started to deteriorate in the prior art magnetooptical recording medium when the value of $P_H$ exceeded 12 mW, which is equal to the laser intensity where the magnetization of the fourth layer 7 started to reverse under examination with a polarizing microscope; obviously, the deterioration of CN ratio results from the reversal of magnetization in the fourth layer 7. In contrast, the CN ratio of the recording medium of Example 6 deteriorated by no more than a few dB upon illumination with 20-mW laser light, and this demonstrates the marked improvement in the heat stability of the fourth layer having a dual structure.

As described on the foregoing pages, the present invention relates basically to a magnetooptical recording medium that is capable of direct overwriting by light modulation and that comprises four magnetic layers superposed on a substrate, with individual magnetic layers being bound by exchange force. According to one embodiment, a fifth magnetic layer is provided on the top fourth layer without being bound to it by exchange force. This arrangement obviates the need to equip the recording medium with a source of generating an external magnetic field, whereby the construction of equipment can be simplified and easily reduced in size and thickness.

According to another the one embodiment, an amorphous alloy layer in which the magnetization of sub-lattices of rare earth elements is dominant is provided between the first and second magnetic layers. This arrangement is effective not only in reducing the exchange force acting between the first and second magnetic layers at temperatures near room temperature but also in permitting magnetooptical recording media to be fabricated in a consistent way. As a consequence, magnetooptical recording media capable of direct overwriting by light modulation that have improved characteristics can be manufactured at a higher production rate.

According to yet another the embodiment, claims 4 and 5 or claims 6 and 7, a layer made of a Nd-containing rare earth element/transition metal alloy film or a magnetic layer (a zeroth magnetic layer) consisting of alternate films of Pt or Pd and Co is provided adjacent the first magnetic layer in such a manner that they are bound to the first magnetic layer by exchange force. Having this arrangement, the recording medium of the present invention is capable of direct overwriting by light intensity modulation and yet it yields satisfactory reproduction output at shorter wavelengths.

According to the embodiment, a fifth magnetic layer is provided over the fourth magnetic layer in such a manner that the two layers are bound to each other by exchange force. This arrangement is effective not only in reducing the external magnetic filed to be applied but also in increasing the durability of the medium under illumination with light of high output power.

What is claimed is:

1. A magnetooptical recording medium that is capable of direct overwriting by light intensity modulation, comprising:
    a first magnetic layer disposed on a substrate;
    a second magnetic layer disposed on the first layer;
    a third magnetic layer disposed on the second layer;
    a fourth magnetic layer disposed on the third layer;
    each of said magnetic layers having vertical magnetic anisotropy and wherein any two adjacent layers are bound by exchange force between said adjacent layers; and
    an additional layer disposed on the fourth magnetic layer and comprising a fifth magnetic layer having vertical magnetic anisotropy and not bound by exchange force.

2. A magnetooptical recording medium as recited in claim 1 wherein the fifth magnetic layer has a Curie point of at least 300° C.

3. A magnetooptical recording medium that is capable of direct overwriting by light intensity modulation, comprising:
    a first magnetic layer disposed on a substrate;
    a second magnetic layer disposed on the first layer;
    a third magnetic layer disposed on the second layer; a fourth magnetic layer disposed on the third layer; each of said magnetic layers having vertical magnetic anisotropy and wherein any two adjacent layers are bound by exchange force between said adjacent layers; and a layer made of a rare earth element/transition metal alloy in which the magnetization of sublattices of rare earth elements is dominant, said layer disposed between the first and second magnetic layers and bound thereto by exchange force.

4. A magnetooptical recording medium that is capable of direct overwriting by light intensity modulation, comprising:
    a first magnetic layer disposed on a substrate;
    a second magnetic layer disposed on the first layer;
    a third magnetic layer disposed on the second layer;
    a fourth magnetic layer disposed on the third layer;
    each of said magnetic layers having vertical magnetic anisotropy and wherein any two adjacent layers are bound by exchange force between said adjacent layers; and
    a layer comprising a Nd containing rare earth element/transition metal alloy film disposed between the first magnetic layer and the substrate, said layer being bound to the first magnetic layer by exchange force.

5. A magnetooptical recording medium as recited in claim 4 in which the Nd-containing rare earth element/transition metal alloy film is made of NdTbFeCo, NdDyFeCo or NdGdFeCo, with Nd being added in an amount of up to 20 atm.% of FeCo.

6. A magnetooptical recording medium that is capable of direct overwriting by light intensity modulation, comprising:
    a first magnetic layer disposed on a substrate;
    a second magnetic layer disposed on the first layer;
    a third magnetic layer disposed on the second layer;
    a fourth magnetic layer disposed on the third layer;
    each of said magnetic layers having vertical magnetic anisotropy and wherein any two adjacent layers are bound by exchange force between said adjacent layers; and an additional magnetic layer that is adjacent the first magnetic layer into which a light beam is first admitted and that comprises alternate superimposed films of Pt or Pd and Co, said additional magnetic layer being bound to the first magnetic layer by exchange force.

7. A magnetooptical recording medium as recited in claim 6 wherein the magnetic layer that consists of alternate films of Pt or Pd and Co in superposition has a Curie point lower than that of the first magnetic layer.

8. A magnetooptical recording medium that is capable of direct overwriting by light intensity modulation, comprising:

a first magnetic layer disposed on a substrate;

a second magnetic layer disposed on the first layer;

a third magnetic layer disposed on the second layer;

a fourth magnetic layer disposed on the third layer;

each of said magnetic layers having vertical magnetic anisotropy and wherein any two adjacent layers are bound by exchange force between said adjacent layers; and a fifth magnetic layer bound by exchange force disposed on the fourth magnetic layer said fourth and fifth magnetic layers comprising a rare earth element/transition metal alloy, said fourth layer being transition metal dominant at room temperature and said fifth layer being rare earth element dominant at room temperature.

9. A magnetooptical recording medium as recited in claim 1, said additional layer further comprising:

a nonmagnetic layer disposed between the fourth magnetic layer and the fifth magnetic layer for blocking the exchange force acting between the fourth magnetic layer and the fifth magnetic layer.

10. A magnetooptical recording medium as recited in any one of claims 1-9, further comprising:

a dielectric layer disposed between said substrate and said magnetic layers.

11. A magnetooptical recording medium as recited in claim 10, wherein said dielectric layer is formed of a silicon nitride.

12. A magnetooptical recording medium as recited in any one of claims 1-9, further comprising:

a protective layer disposed on said medium, and a side opposite said substrate.

13. A magnetooptical recording medium as recited in claim 12, wherein said protective layer is formed of a silicon nitride.

14. A magnetooptical recording medium as recited in claim 12, further comprising:

a dielectric layer disposed between said substrate and said magnetic layers.

15. A magnetooptical recording medium as recited in claim 14, wherein said dielectric layer and said protective layer are each formed of a silicon nitride.

16. A magnetooptical recording medium that is capable of direct overwriting by light intensity modulation, comprising:

a first magnetic layer disposed on a substrate;

a second magnetic layer disposed on the first layer;

a third magnetic layer disposed on the second layer;

a fourth magnetic layer disposed on the third layer;

each of said magnetic layers having vertical magnetic anisotropy and wherein any two adjacent layers are bound by exchange force between said adjacent layers; and a fifth magnetic layer having vertical anisotropy and disposed in one of the positions consisting of: on the fourth magnetic layer and said fifth magnetic layer not bound thereto by exchange force, between the first and second magnetic layers and said fifth magnetic layer bound thereto by exchange force, and between the substrate and first magnetic layer and said fifth magnetic layer bound thereto by exchange force.

* * * * *